US010078537B1

United States Patent
Nanda et al.

(10) Patent No.: US 10,078,537 B1
(45) Date of Patent: Sep. 18, 2018

(54) ANALYTICS PLATFORM AND ASSOCIATED CONTROLLER FOR AUTOMATED DEPLOYMENT OF ANALYTICS WORKSPACES

(71) Applicants: EMC Corporation, Hopkinton, MA (US); EMC IP Holding Company LLC, Hopkinton, MA (US)

(72) Inventors: Nihar Nanda, Acton, MA (US); Timothy Bruce, Carrollton, TX (US); David Stephen Reiner, Lexington, MA (US); Rajesh Manjrekar, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 274 days.

(21) Appl. No.: 15/197,109

(22) Filed: Jun. 29, 2016

(51) Int. Cl.
  *G06F 9/50* (2006.01)
  *H04L 12/24* (2006.01)
  *G06F 9/445* (2018.01)
  *G06F 9/44* (2018.01)
  *G06F 3/048* (2013.01)
  (Continued)

(52) U.S. Cl.
  CPC ............ *G06F 9/5055* (2013.01); *G06F 3/048* (2013.01); *G06F 8/20* (2013.01); *G06F 8/60* (2013.01); *H04L 41/0273* (2013.01); *H04L 41/22* (2013.01); *G06F 17/30126* (2013.01)

(58) Field of Classification Search
  None
  See application file for complete search history.

(56) References Cited

U.S. PATENT DOCUMENTS 8,838,556 B1    9/2014 Reiner et al.
9,141,908 B1    9/2015 Reiner et al.
(Continued)

FOREIGN PATENT DOCUMENTS

WO    2011130128 A1    10/2011

OTHER PUBLICATIONS

U.S. Appl. No. 14/487,520 filed in the name of Nihar Nanda et al. Sep. 16, 2014 and entitled "Data Set Virtual Neighborhood Characterization, Provisioning and Access."
(Continued)

*Primary Examiner* — Qing Yuan Wu
(74) *Attorney, Agent, or Firm* — Ryan, Mason & Lewis, LLP

(57) ABSTRACT

An apparatus in one embodiment comprises an analytics platform and a controller. The controller is associated with the analytics platform and configured to control automated deployment of analytics workspaces of the analytics platform. The analytics platform includes or otherwise has access to sets of at least data ingestion engines, data containers, analytics tools and virtual resources. The controller is configured to deploy a given one of the analytics workspaces of the analytics platform as an at least partially user-specified combination of particular selected ones of the data ingestion engines, data containers, analytics tools and virtual resources. The controller may additionally be configured to monitor usage of the combination of particular selected ones of the data ingestion engines, data containers, analytics tools and virtual resources of the given analytics workspace, and to alter the combination responsive to the monitoring.

20 Claims, 7 Drawing Sheets

(51) Int. Cl.
  *G06F 17/30* (2006.01)
  *G06F 8/20* (2018.01)
  *G06F 8/60* (2018.01)

(56) References Cited

U.S. PATENT DOCUMENTS

| | | | |
|---|---|---|---|
| 2010/0114899 | A1 | 5/2010 | Guha et al. |
| 2011/0066590 | A1 | 3/2011 | Chang et al. |
| 2011/0077973 | A1 | 3/2011 | Breitenstein et al. |
| 2012/0136806 | A1 | 5/2012 | Anderson et al. |
| 2014/0258250 | A1 | 9/2014 | Ge et al. |
| 2014/0358975 | A1 | 12/2014 | Nivargi et al. |
| 2015/0281319 | A1* | 10/2015 | Maturana .............. G06F 9/5072 709/202 |
| 2015/0281356 | A1 | 10/2015 | Maturana et al. |
| 2016/0019272 | A1 | 1/2016 | Liu et al. |
| 2017/0091968 | A1* | 3/2017 | George ................. G06T 11/206 |
| 2017/0316050 | A1* | 11/2017 | Hill ................... G06F 17/30398 |

OTHER PUBLICATIONS

E.J. Richardson et al., "Meta4: A Web Application for Sharing and Annotating Metagenomic Gene Predictions Using Web Services," Frontiers in Genetics, Methods Article, Sep. 5, 2013, pp. 1-6, vol. 4, Article 168.

ey.com, "Forensic Data Analytics: Globally Integrated Compliance Review, Litigation Support and Investigative Services," http://www.ey.com/Publication/vwLUAssets/EY-Forensic-data-analytics/$FILE/EY-Forensic-data-analytics.pdf, 2013, 12 pages.

Philip Russom, "Active Data Archiving: for Big Data, Compliance, and Analytics," TDWI Research, TDWI Checklist Report, http://rainstor.com/2013_new/wp-content/uploads/2014/11/WP_TDWI_ChecklistReport_Rainstor_Active-Data-Archiving.pdf, May 2014, 8 pages.

Booz Allen Hamilton, "Data Lake-Based Approaches to Regulatory-Driven Technology Challenges: How a Data Lake Approach Improves Accuracy and Cost Effectiveness in the Extract, Transform, and Load Process for Business and Regulatory Purposes," http://www.boozallen.com/content/dam/boozallen/media/file/data-lake-based-approaches-to-regulatory-driven-tech-changes.pdf, Apr. 2013, 6 pages.

Mike Ferguson, "Architecting a Big Data Platform for Analytics," White Paper, Intelligent Business Strategies, Oct. 2012, 36 pages.

Joe Nicholson, "Beyond BI: Big Data Analytic Use Cases," Datameer, Aug. 22, 2013, 7 pages.

U.S. Appl. No. 14/614,011 filed in the name of David Stephen Reiner et al. Feb. 4, 2015 and entitled "Integrating Compliance and Analytic Environments Through Data Lake Cross Currents."

U.S. Appl. No. 15/074,597 filed in the name of David Stephen Reiner et al. Mar. 18, 2016 and entitled "Data Set Discovery Engine Comprising Relativistic Retriever."

U.S. Appl. No. 15/088,029 filed in the name of David Reiner et al. Mar. 31, 2016 and entitled "A Registration Framework for an Analytics Platform."

U.S. Appl. No. 15/088,085 filed in the name of David Reiner et al. Mar. 31, 2016 and entitled "Data Governance Through Policies and Attributes."

* cited by examiner

ANALYTICS PLATFORM AND ASSOCIATED CONTROLLER FOR AUTOMATED DEPLOYMENT OF ANALYTICS WORKSPACES

Field

The field relates generally to information processing systems, and more particularly to techniques for implementing data analytics functionality in information processing systems.

Background

Information processing systems increasingly utilize reconfigurable virtual resources to meet changing user needs in an efficient, flexible and cost-effective manner. For example, cloud computing and storage systems implemented using virtual resources have been widely adopted. Other virtual resources now coming into widespread use in information processing systems include Linux containers. Such containers may be used to provide at least a portion of the virtualization infrastructure of a given information processing system.

Despite these and other significant advances, substantial obstacles remain in certain information processing contexts. For example, it can be unduly difficult to implement data analytics functionality under current practice.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown.

Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

It should also be noted that illustrative embodiments of the invention can include, without limitation, apparatus, systems, methods, and computer program products comprising processor-readable storage media.

Figure 1:
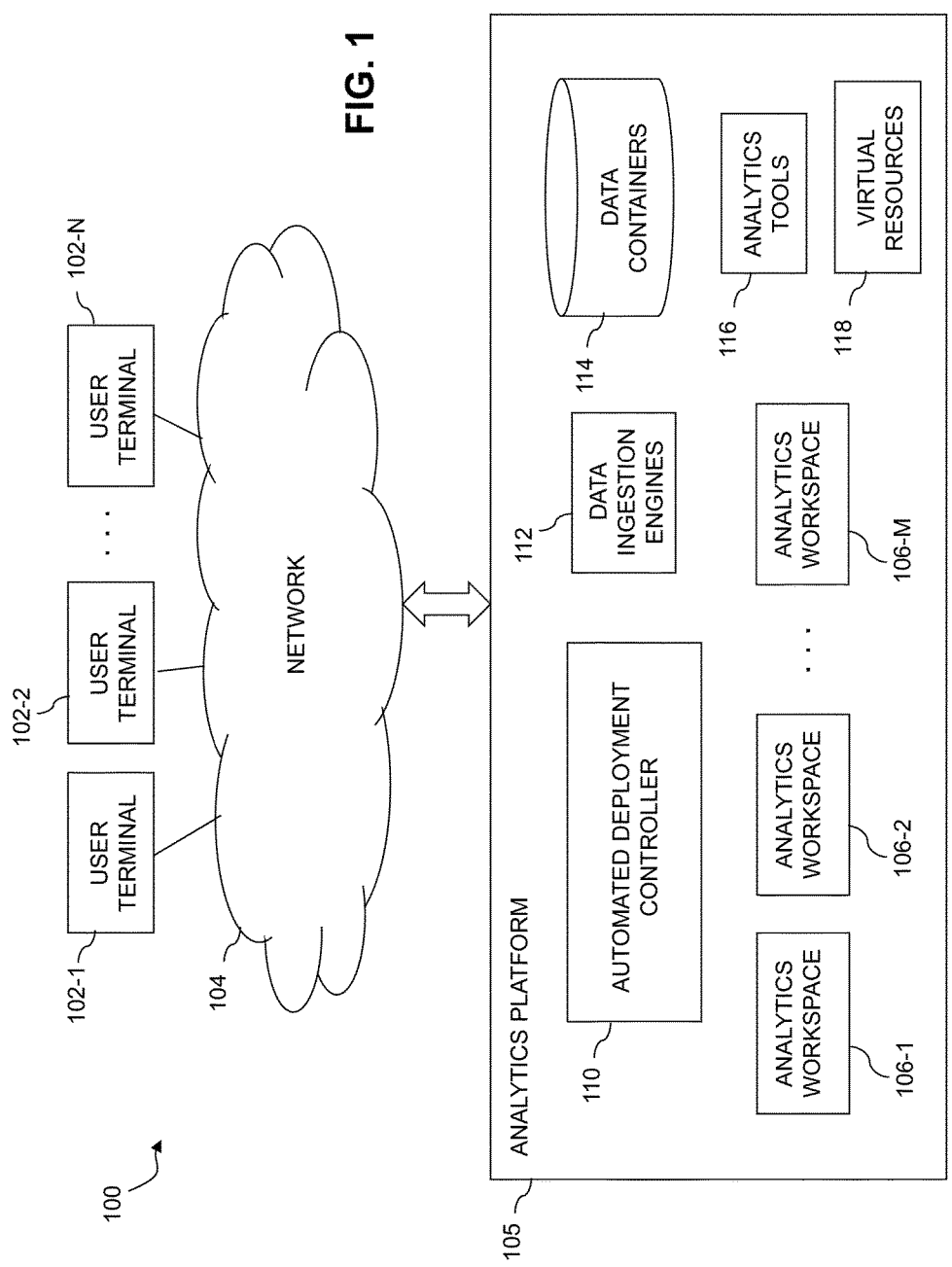
FIG. 1 is a block diagram of an information processing system comprising an analytics platform configured for automated deployment of analytics workspaces in an illustrative embodiment of the invention.

FIG. 1 shows an information processing system 100 configured in accordance with an illustrative embodiment of the present invention. The information processing system 100 is assumed to be built on at least one processing platform and provides functionality for automated deployment of analytics workspaces of at least one analytics platform. In this embodiment, the system 100 more particularly comprises a plurality of user terminals 102-1, 102-2, . . . 102-N coupled to a network 104. Also coupled to the network 104 is an analytics platform 105 comprising a plurality of analytics workspaces 106-1, 106-2, . . . 106-M. At least a subset of the analytics workspaces 106 are deployed in an automated manner under the control of an automated deployment controller 110.

The user terminals 102 can comprise, for example, desktop, laptop or tablet computers, mobile telephones, or other types of processing devices capable of communicating with the analytics platform 105 over the network 104.

The analytics platform 105 has access to sets of at least data ingestion engines 112, data containers 114, analytics tools 116 and virtual resources 118. The controller 110 is configured to deploy a given one of the analytics workspaces 106 of the analytics platform 105 as an at least partially user-specified combination of particular selected ones of the data ingestion engines 112, data containers 114, analytics tools 116 and virtual resources 118. In addition, the controller 110 is configured to adjust the given analytics workspace by altering the combination of particular selected ones of the data ingestion engines 112, data containers 114, analytics tools 116 and virtual resources 118.

This "altering" of the combination is intended to be broadly construed, so as to encompass changes in the configuration of one or more of the instances of the data ingestion engines 112, data containers 114, analytics tools 116 and virtual resources 118 that make up the combination, such as changes in their respective parameters or other aspects of their deployment or management.

These and other adjustments may be carried out on a periodic basis, or based on other factors such as detected usage conditions.

For example, the controller 110 in some embodiments is configured to monitor usage of the combination of particular selected ones of the data ingestion engines 112, data containers 114, analytics tools 116 and virtual resources 118 of the given analytics workspace and to alter the combination responsive to the monitoring. As a more particular example, the controller 110 can be configured to alter the combination so as to maintain enforcement of a policy-based quota or a service level agreement (SLA) for at least one component, resource, process or service associated with the given analytics workspace. It is also possible that one or more SLAs can be established for the given analytics workspace itself. The policy-based quota may more particularly comprise, for example, a policy-based resource quota.

It should be noted that the controller 110 is illustratively configured to execute multiple threads of installation activities in parallel. Accordingly, multiple analytics workspaces 106 can be generated substantially simultaneously within the system 100. Additionally or alternatively, a given workspace can be deployed more rapidly when its components are deployed in parallel.

The controller 110 can additionally or alternatively provide other types of functionality in support of the deployment of the analytics workspaces 106. For example, the controller 110 can provision one or more published data sets to a given one of the analytics workspaces 106, although other types of provisioning of data sets can be implemented by the controller 110 without the data sets being published. As another example, the controller 110 can provision role-based access control (RBAC), attribute-based access control (ABAC) or other types of security functionality to the given analytics workspace so as to control user access to at least one component, resource, process or service associated with that analytics workspace. As yet another example, the controller can provision one or more microservices to the given analytics workspace. Various combinations of these and other types of controlled deployment functionality can be provided for each of the analytics workspaces 106. As one possible alternative, the above-noted provisioning of RBAC, ABAC or other security functionality to the given analytics workspace can be for the analytics workspace as a whole, rather than for specific components, resources, processes or services associated with that analytics workspace.

In some embodiments, the controller 110 is configured to recommend to a corresponding user of a given one of the analytics workspaces 106 additional ones of the data ingestion engines 112, data containers 114, analytics tools 116 and virtual resources 118 for inclusion in the given analytics workspace. Such a recommendation by the controller 110 is illustratively based at least in part on one or more of user profile similarities, user requirement similarities and historical usage patterns relating to the given analytics workspace and one or more other ones of the analytics workspaces 106. The historical usage patterns may illustrative comprise historical usage of an individual user or users of the given analytics workspace, or groups of multiple users of several analytics workspaces, or combinations of such arrangements.

The data ingestion engines 112 illustratively include a wide variety of different types of data ingestion engines, including streaming ingestors such as Kafka, Storm, Flume, PIG and Spring XD, messaging ingestors such as RabbitMQ, MQ and Kafka, batch file ingestors, and SQL adaptors such as JDBC and ODBC.

The data containers 114 may comprise, for example, data containers associated with distributed databases, including Hadoop databases such as Hortonworks or Cloudera, NoSQL databases such as MongoDB, and indexers such as Attivio, as well as others such as Cassandra, HAWQ and Impala. Other data containers may comprise dedicated instance data containers, including key-value stores implemented using Radis, and SQL databases implemented using My SQL or Postgres SQL.

The analytics tools 116 in some embodiments include tools such as Python, R, MapR, Tableau, MatLab, MADlib, Octave, SciPy and NumPy. These and other analytics tools allow data scientists and other users to develop models, dashboards, and associated data analytics applications within a given analytics workspace.

The virtual resources 118 of the analytics platform 105 may include particular arrangements of compute, storage and network resources. For example, the virtual resources 118 can include virtual machines or Linux containers (LXCs), or combinations of both as in an arrangement in which Docker containers or other types of LXCs are configured to run on virtual machines.

The particular types of data ingestion engines 112, data containers 114, analytics tools 116 and virtual resources 118 mentioned above should be considered examples only, and not requirements of certain embodiments.

It is further assumed in conjunction with the FIG. 1 embodiment that the analytics platform 105 additionally has access to multiple data transport protocols of different types, and that the controller 110 is configured to deploy a given one of analytics workspaces 106 so as to include functionality for selected ones of the data transport protocols. For example, the given analytics workspace may be configured to receive data from multiple selected ones of the data ingestion engines 112, with each such data ingestion engine using one or more different data transport protocols to provide the data from one or more data sources to the given analytics workspace. The particular data transport protocols deployed by the controller 110 in conjunction with the various analytics workspaces 106 will generally depend on factors such as the particular number, type, size, and refresh rate of data sources from which those workspaces will receive data via one or more of the data ingestion engines 112.

When a given one of the analytics workspaces 106 deployed by the controller is no longer needed by its corresponding user or users, the controller 110 is illustratively configured to break down the given analytics workspace such that any portion of the virtual resources 118 previously associated with that analytics workspace are made available for potential use in one or more other ones of the analytics workspaces 106. For example, virtual resources such as compute, network and storage resources may be returned to a pool of such resources in order to be made available to the other analytics workspaces 106. The pool of virtual resources can also be made more generally available to other components of the system 100.

The various instances of data ingestion engines 112, data containers 114 and analytics tools 116 previously deployed to the given analytics workspace may be terminated in conjunction with the breaking down of that analytics workspace. Data assets associated with the given analytics workspace may be backed up to a storage system associated with the analytics platform 105 upon request or under other conditions. Such a storage system may be implemented at least in part within the analytics platform 105, or may be entirely external to the analytics platform 105. Numerous additional examples of automated deployment control functionality implemented in illustrative embodiments using at least one controller associated with an analytics platform will be provided elsewhere herein.

Although not explicitly shown in FIG. 1, one or more ingestion managers may be associated with the data ingestion engines 112. For example, such an ingestion manager may be at least partially incorporated into the automated deployment controller 110, and may be configured to select one or more of the data ingestion engines 112 for providing data to a given one of the analytics workspaces 106 of the analytics platform 105. Additional details regarding illustrative examples of ingestion managers suitable for use in one or more embodiments of the present invention can be found in U.S. patent application Publication No. 2018/0004826, entitled "Ingestion Manager for Analytics Platform," which is commonly assigned herewith and incorporated by reference herein.

For example, two or more of the analytics workspaces 106 of the analytics platform 105 may be configured to receive data from respective potentially disjoint subsets of the data ingestion engines 112 under the control of the ingestion manager. Such functionality is illustratively provided using a data-as-a-service model, although other types of data delivery models can be used. The received data may be ingested into operational data containers (ODCs) that are accessible to each of at least a subset of the analytics workspaces 106 of the analytics platform 105.

The data ingestion engines 112 can be configured to ingest data from numerous different types of data sources, including, for example, relational database management systems, distributed NoSQL systems, event streams, log files and many others. Data may be delivered from the data sources to the data ingestion engines 112 utilizing a wide variety of different types of data transport mechanisms, including, for example, file copies over HTTP or SFTP, JDBC, REST, Kafka, Flume, and vendor-specific interfaces.

Although the automated deployment controller 110 is shown in the FIG. 1 embodiment as being implemented within the analytics platform 105, in some embodiments the controller 110 can be implemented at least in part outside of the analytics platform 105. Other types of associations between the controller 110 and the analytics platform 105 are possible. Also, it is possible that at least portions of the data ingestion engines 112 or other components of the analytics platform 105 can be at least partially incorporated into the controller 110.

An analytics platform or other type of processing platform as disclosed herein can comprise one or more storage systems.

Such storage systems can comprise any of a variety of different types of storage including network-attached storage (NAS), storage area networks (SANs), direct-attached storage (DAS) and distributed DAS, as well as combinations of these and other storage types, including software-defined storage.

Particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from EMC Corporation. Combinations of multiple ones of these and other storage products can also be used in implementing a given storage system in an illustrative embodiment.

The term "analytics platform" as used herein is intended to be broadly construed, so as to encompass a wide variety of different processing environments involving data analysis, including cloud-based environments. The term "analytics workspace" is similarly intended to be broadly construed, so as to encompass a wide variety of different types of workspaces, including, for example, various types of areas, sandboxes and other spaces utilized at least in part for data analysis, as well as other types of workspaces such as application development workspaces of an application development environment. Also, an entire analytics platform in some embodiments can itself be viewed as an analytics workspace in the absence of particular defined analytics workspaces.

In some embodiments, the analytics platform 105 comprises at least one data lake, such as a business data lake or BDL.

The term "data lake" as utilized herein is intended to be broadly construed so as to encompass, for example, a data repository that stores data without optimization for particular predetermined types of analysis or other processing. For example, a data lake can be configured to store data in a manner that facilitates flexible and efficient utilization of the stored data to support processing tasks that may be at least partially unknown or otherwise undefined at the time of data storage. This is in contrast to so-called data warehouses or data marts, which generally store data in accordance with particular predefined sets of data attributes or with predetermined data interrelationships.

Moreover, a data lake in some embodiments can provide the ability to deal with flexible combinations of a wide variety of different types of data in different analytics contexts. Examples of analytics contexts that may be supported by one or more analytics platforms in illustrative embodiments include financial services, telecommunications, health care, life sciences, manufacturing, energy, transportation, entertainment, data center security, sensor data processing and numerous others.

Data lakes in some embodiments provide the ability for the users to store different types of data in various data containers of their choosing. The data containers may be provided in multiple types, formats and storage capabilities. A given data scientist or other user may prefer to utilize one type of data container over another based on familiarity, standards, type of analytics, type of models and processing capabilities.

A wide variety of different use cases of the system 100 can be supported based on implementation-specific factors such as the data types being ingested, the volume of data being ingested, the intended use of the ingested data, and the analytics workspace functionality desired in a given application. For example, a given embodiment can be configured to ingest and analyze voicemail messages in a real-time surveillance application. Another embodiment can be configured to provide an analytic sandbox for data exploration and clustering model development.

The FIG. 1 embodiment advantageously provides automated creation of analytics workspaces for data scientists and other users. For example, the controller 110 can be configured to orchestrate the creation of a fully-functional analytics workspace for a given user, possibly in response to particular specifications or feature selections provided by that user. The controller 110 illustratively automates installation and breakdown of the particular components needed for each of the analytics workspaces 106. The installed components are ready to use without requiring that the individual users each have the detailed knowledge that might otherwise be required to deploy those components. Functionality such as secure access control and quota management are provided automatically by the controller. The analytics workspaces 106 are readily scalable through the provision of additional resources to those workspaces, possibly in conjunction with inclusion of additional instances of the data ingestion engines 112, data containers 114, analytics tools 116 and virtual resources 118. Additionally, users can add or remove additional instances of data ingestion engines 112, data containers 114, analytics tools 116 and virtual resources 118 as needed.

It is to be appreciated that the particular arrangement of system components illustrated in FIG. 1 is exemplary only, and that numerous other arrangements of components may be used in other embodiments.

The system 100 may therefore include additional or alternative components not explicitly shown in the figure.

For example, one or more of the user terminals 102 can each include a graphical user interface (GUI) associated with the analytics platform 105 or controller 110 in order to support user control of at least portions of the automated deployment functionality or the data analytics functionality of the system.

Moreover, the particular arrangement of analytics platform 105, analytics workspaces 106, controller 110 and other components in the FIG. 1 embodiment is illustrative only, and can be varied in other embodiments.

For example, in other embodiments, the automated deployment controller 110 is one of a plurality of controllers associated with the analytics platform 105, with the controllers being configured in accordance with a hierarchical architecture in which at least one controller at an upper level of the hierarchical architecture requests services from one or more other controllers at one or more lower levels of the hierarchical architecture. As another example of a possible hierarchical arrangement, there may be multiple controllers at an upper level of the hierarchy, invoked by another component. The latter component may illustratively comprise a Data and Analytics Catalog (DAC) of the type to be described below in conjunction with the embodiments of FIGS. 3 and 4. The DAC in some embodiments may be viewed as an asset manager or as a controller manager configured to manage or invoke multiple controllers.

In some embodiments, the analytics platform 105 is replaced with or augmented with another type of processing environment that can benefit from controlled automated deployment of multiple workspaces. For example, an automated deployment controller of the type disclosed herein can be configured in other embodiments to control deployment of multiple application development workspaces of an application development environment, and can provide similar functionality in other types of processing environments.

As mentioned previously, the information processing system 100 is assumed in the present embodiment to be implemented on a given processing platform comprising one or more processing devices. Such a processing platform can comprise various combinations of physical and virtual resources. Illustrative examples of such processing platforms that may be used to implement at least portions of the system 100 will be described in more detail below in conjunction with FIGS. 6 and 7.

Figure 2:
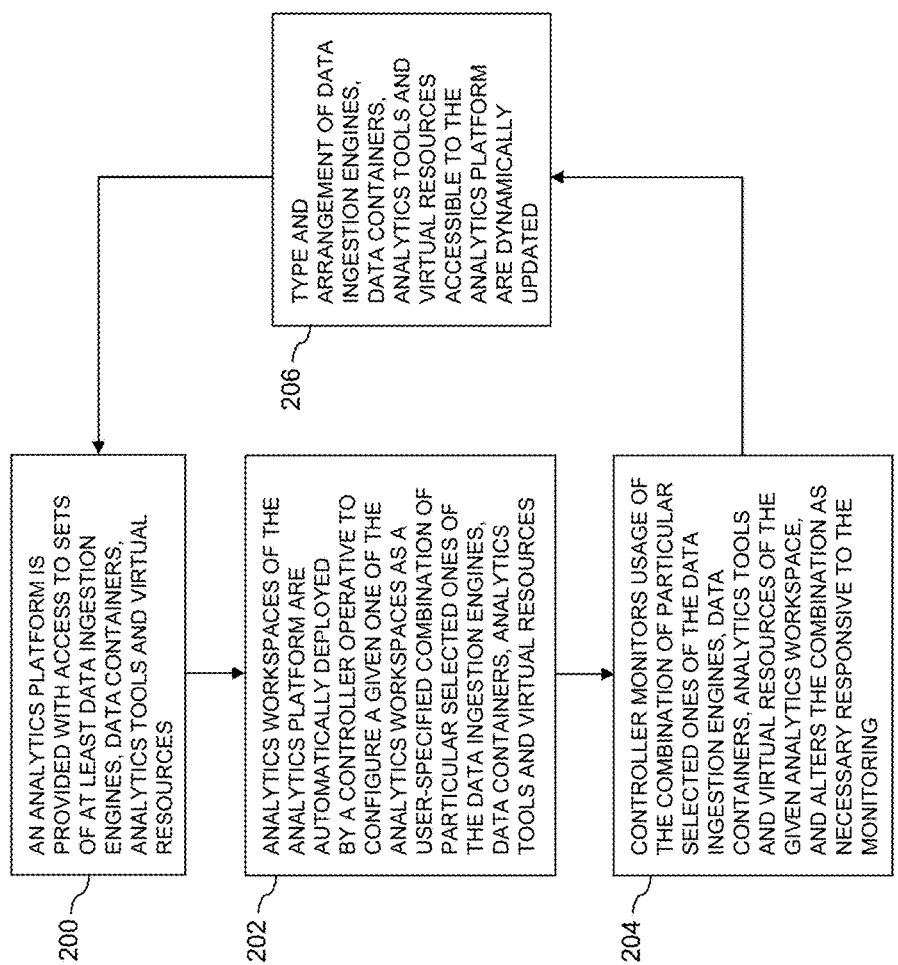
FIG. 2 is a flow diagram of an example process for automated deployment of analytics workspaces of an analytics platform in an illustrative embodiment.

FIG. 2 shows a flow diagram of an example process for automated deployment of analytics workspaces of an analytics platform. The process is illustratively performed by automated deployment controller 110 operating in conjunction with other system components such as analytics workspaces 106, data ingestion engines 112, data containers 114, analytics tools 116 and virtual resources 118, but could be performed by numerous other types of systems. The process as shown includes steps 200, 202, 204 and 206, although wide variety of additional or alternative automated deployment processes can be used in other embodiments.

In step 200, an analytics platform is provided with access to sets of at least data ingestion engines, data containers, analytics tools and virtual resources. In the context of the FIG. 1 embodiment, the analytics platform 105 incorporates data ingestion engines 112, data containers 114, analytics tools 116 and virtual resources 118. Although illustratively shown as being part of the analytics platform 105 in the FIG. 1 embodiment, these and other system components in other embodiments can be implemented at least in part externally to the analytics platform. For example, the analytics platform may have access to these or other system components over one or more networks.

It should be noted in this regard that the term "data" as used herein in the context of data ingestion, data containers and data analytics is intended to be broadly construed. Such data in some embodiments illustratively comprises arrangements that are referred to herein as "data sets." These data sets may comprise respective abstractions each representing a collection of similarly-structured data.

For example, a "data set" as the term is broadly used herein may be viewed, for example, as an abstraction of one or more data items, such as a table, document, file, query result, set of key-value pairs, index, storage block contents, in-memory caches or other data items or combinations thereof, where the given data set is characterized by properties as well as relationships to other data sets. These properties and relationships are captured by metadata that is associated with the data set in the system 100. For example, metadata can be used to describe data set characteristics such as ownership, type, content, schema, classification, matchable patterns, text analytics characterizations, security classifications, provenance, usability, quality, ad hoc user tags, and many others.

It should also be noted that some of these data set characterizations may overlap. For example, a set of key-value pairs may be stored as a file.

Additional details regarding exemplary data sets and metadata characterizing those data sets, as well as techniques for reasoning over such metadata and possibly also corresponding data set content, can be found in U.S. Pat. No. 8,838,556, entitled "Managing Data Sets by Reasoning over Captured Metadata," U.S. Pat. No. 9,141,908, entitled "Dynamic Information Assembly for Designated Purpose based on Suitability Reasoning over Metadata," and U.S. patent application Ser. No. 14/487,520, filed Sep. 16, 2014 and entitled "Data Set Virtual Neighborhood Characterization, Provisioning and Access," all of which are commonly assigned herewith and incorporated by reference herein. It is to be appreciated, however, that such data sets and reasoning techniques are considered examples only, and need not be utilized in other embodiments.

In step 202, analytics workspaces of the analytics platform are automatically deployed by a controller operative to configure a given one of the analytics workspaces as a user-specified combination of particular selected ones of the data ingestion engines, data containers, analytics tools and virtual resources.

An example of the controller of step 202 in the context of the FIG. 1 embodiment is the automated deployment controller 110. The controller 110 in the FIG. 1 embodiment is shown as a component of the analytics platform 105, but in other embodiments may be implemented at least in part externally to the analytics platform. For example, it may be implemented on a separate processing platform that is configured to communicate with the analytics platform over a network. Numerous other types of associations can be used to provide the controller 110 with an ability to control automated deployment of analytics workspaces 106 of the analytics platform 105.

Data may be provided to a given one of the analytics workspaces 106 by, for example, one or more particular instances of the data ingestion engines 112 deployed under the control of the automated deployment controller 110. It is also possible that the data may already have been ingested into the analytics platform 105, and may be residing in one or more of the data containers 114. In that case, it may be copied or otherwise provided (e.g., as a service) to the given analytics workspace. Mechanisms for such data provision may be considered at least part of an "ingestion engine" as that term is broadly used herein.

The data provided to the given analytics workspace is utilized in that workspace, for example, by a human user or by one or more instances of the analytics tools 116, which may illustratively comprise automated or partially-automated tools.

Data ingestion engines 112 subject to deployment by controller 110 may be required in some embodiments to register with the controller 110 or otherwise provide the controller 110 with details enabling ingestion engine deployment before being considered candidates for such deployment.

The controller in the FIG. 2 process can be configured to permit the analytics workspaces of the analytics platform to register to receive data from respective potentially disjoint subsets of the ingestion engines. Such registration in some embodiments is illustratively implemented at the data source or data set level, possibly in conjunction with a subscribe operation of a publish-subscribe data access model. For example, published data sets can be provisioned to analytics workspaces as working sets.

In some embodiments, the selection of one or more of the ingestion engines for providing data to a given analytics workspace is based at least in part on data transformation or data quality improvement capabilities of the one or more ingestion engines. Accordingly, ingestion engines can be configured to perform data transformations or data quality improvement as part of ingestion, and may be selected based at least in part on their ability to do so.

An ingestion manager associated with the controller is illustratively configured to orchestrate one or more characteristics of a data ingestion process implemented by at least one of the ingestion engines. For example, this may involve transmitting, logging, or otherwise acting on alerts or errors encountered or generated by an ingestion engine. As another example, controlling orchestration of an ingestion process implemented by an ingestion engine may include restarting ingestion, or possibly re-ingesting some portion of the data source. The controller may be configured to deploy an ingestion manager or its associated ingestion engines, or call upon their services to provision working sets.

Such an ingestion manager can also be configured to provide one or more data ingestion functions not provided by one or more of the ingestion engines, thereby augmenting the capabilities of the ingestion engines. For example, if a given ingestion engine cannot perform joins of relational tables being ingested simultaneously from related sources, the ingestion manager of the controller may be configured to provide join processing layered on top of the capabilities of the given ingestion engine.

The ingestion manager in some embodiments can be configured to control the ingestion of data into ODCs that are accessible to each of at least a subset of the analytics workspaces of the analytics platform. Such ODCs can be illustratively implemented in the form of what are also referred to as "staging areas" or "landing zones." The use of these and other types of ODCs can advantageously optimize ingestion and minimize re-ingestion into the analytics workspaces of the analytics platform. In some embodiments, ODCs are shared between multiple users and implemented using data stores based at least in part on known technologies such as HDFS, MongoDB, MySQL, Hive, etc.

In step 204, the controller monitors usage of the combination of particular selected ones of the data ingestion engines, data containers, analytics tools and virtual resources of the given analytics workspace, and alters the combination as necessary responsive to the monitoring. For example, such monitoring can involve monitoring data usage in the analytics workspaces and maintaining corresponding historical information for use in adjusting selection of particular data ingestion engines for providing data to one or more of the analytics workspaces. Similar monitoring can be used to adjust selection of data containers, analytics tools and virtual resources for the analytics workspaces.

Other types of monitoring can be used in other embodiments. For example, the controller can be configured to monitor usage of ingested data in a given analytics workspace of the analytics platform. It can then identify related data responsive to the monitoring, and adjust a given one of the deployed analytics workspace so as to permit and possibly automate ingestion of the related data by that analytics workspace. In step 206, the type and arrangement of data ingestion engines, data containers, analytics tools and virtual resources accessible to the analytics platform are dynamically updated. The process is then repeated utilizing the updated type and arrangement of data ingestion engines, data containers, analytics tools and virtual resources. It should be noted that the updating step 206 is optional and can be eliminated in other embodiments, although this optionality should not be construed as an indication that any other particular step is required.

As indicated above, the FIG. 2 process can include additional or alternative steps not explicitly shown in the figure.

For example, other implementations of the process can incorporate other types of interaction between the controller and the sets of data ingestion engines, data containers, analytics tools and virtual resources in conjunction with automated deployment of analytics workspaces of an analytics platform.

Additionally or alternatively, the controller in some embodiments is configured to identify relationships between ingested data sets and to create linkages between the data sets based at least in part on the identified relationships. Such an embodiment can make use of functionality similar to that of illustrative embodiments of a relativistic retriever of the type disclosed in U.S. patent application Ser. No. 15/074,597, filed Mar. 18, 2016 and entitled "Data Set Discovery Engine Comprising Relativistic Retriever," which is commonly assigned herewith and incorporated by reference herein.

These relativistic retriever techniques can also be applied by the controller or one or more of the ingestion engines to identify one or more similar data sets relative to a given ingested data set and to control ingestion of the identified similar data sets.

The particular processing operations and other system functionality described in conjunction with the flow diagram of FIG. 2 are presented by way of illustrative example only, and should not be construed as limiting the scope of the invention in any way. Alternative embodiments can use other types of processing operations for controlling automated deployment of analytics workspaces of an analytics platform. For example, the ordering of the process steps may be varied in other embodiments, or certain steps may be performed at least in part concurrently with one another rather than serially.

It should be understood that functionality such as that described in conjunction with the flow diagram of FIG. 2 can be implemented at least in part in the form of one or more software programs stored in memory and executed by a processor of a processing device such as a computer or a virtual machine. As mentioned previously, a memory or other storage device having such program code embodied therein is an example of what is more generally referred to herein as a "processor-readable storage medium."

Additional aspects of illustrative embodiments implementing automated deployment processes of the type described in conjunction with FIG. 2 will now be described with reference to FIGS. 3 through 5.

Figure 3:
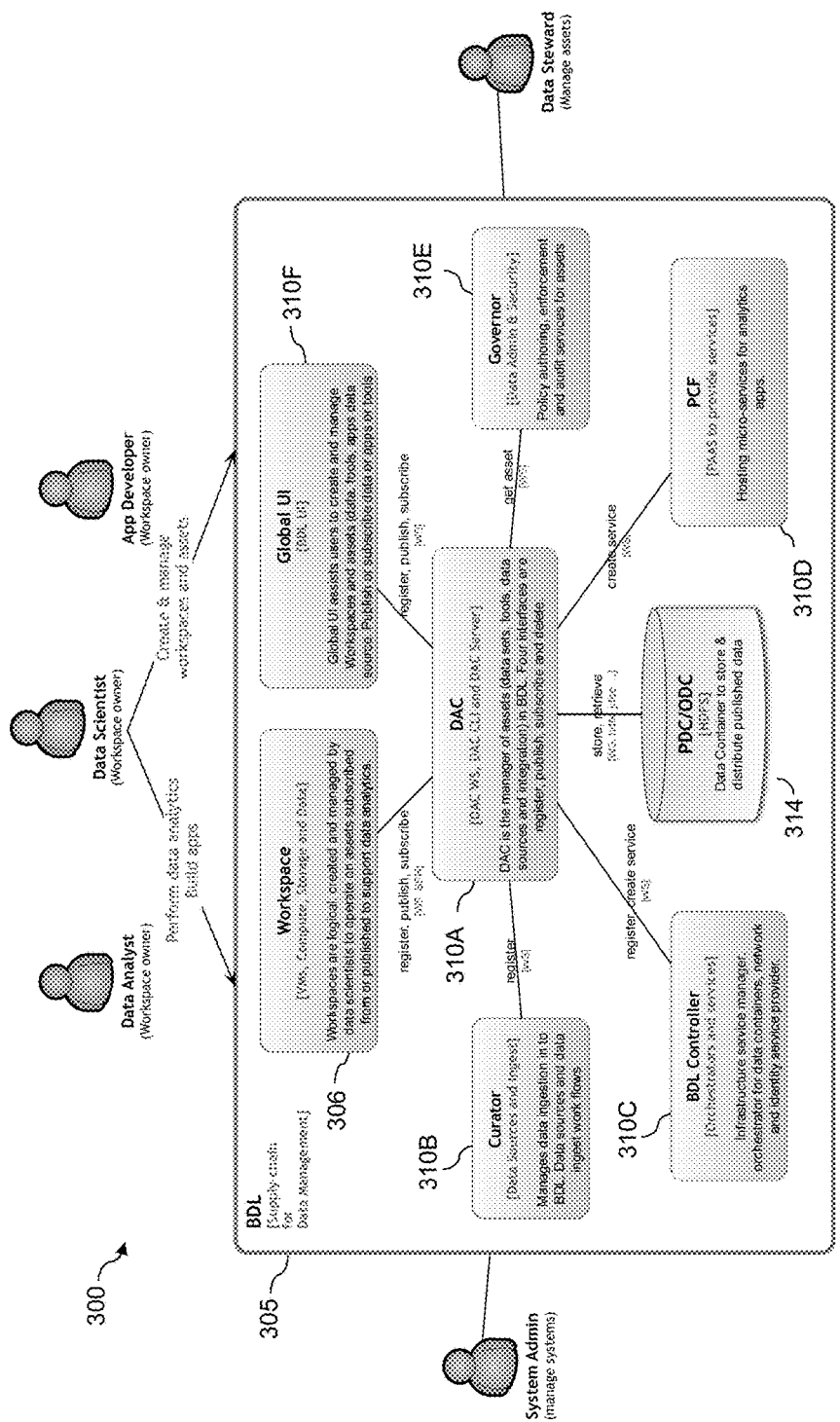
FIG. 3 shows another illustrative embodiment of an information processing system comprising an analytics platform configured for automated deployment of analytics workspaces.

Referring initially to FIG. 3, an information processing system 300 comprises an analytics platform 305. The analytics platform 305 in this embodiment more particularly implements a business data lake or BDL illustratively providing a supply chain for data management.

There are various users associated with the analytics platform 305, including a system administrator, a data steward, a data analyst, a data scientist and an application developer. These are all examples of what are more generally referred to herein as "users." Each such user may have a corresponding user terminal that accesses the analytics platform 305 over at least one network, although these terminals and networks are omitted from the figure for clarity and simplicity of illustration. The system administrator manages systems, the data steward manages assets, and the data analyst, the data scientist and the application developer may each own or otherwise have access to different workspaces within the analytics platform 305. Users other than an owner of a given workspace may obtain access to such a workspace if permitted by the owner or otherwise authorized.

The analytics platform 305 implements at least one workspace 306 accessible to one or more of the users. In this embodiment, the workspace 306 is assumed to comprise a logical workspace created and managed by a particular workspace owner, in this case the data scientist. The workspace 306 operates on assets subscribed from or published to in order to support data analytics functionality in the system 300.

The analytics platform 305 further includes an automated deployment controller 310 which includes multiple distinct components, labeled 310A through 310F. The central component 310A of the control is a Data and Analytics Catalog or DAC configured to manage assets such as data sets, tools, data sources and integration within the analytics platform 305. It illustratively supports interfaces for functions such as register, publish, subscribe and delete, although additional or alternative functions could be supported in other embodiments.

The DAC 310A utilizes web services (WS), command line interface (CLI) and server functionality in communicating with other portions of the analytics platform 305. In some embodiments, the DAC 310A may be implemented as an entirely separate component relative to the overall controller 310. Thus, the DAC is not required to be part of an automated deployment controller associated with the analytics platform 305.

The controller 310 of the analytics platform 305 further comprises a curator 310B, a BDL controller 310C, a Pivotal Cloud Foundry (PCF) 310D, a governor 310E, and a global user interface or UI 310F.

The curator 310B is configured to manage data ingestion into the BDL, as well as data sources and data ingest work flows. It illustratively comprises a plurality of data ingest engines and possibly one or more associated ingestion managers.

The BDL controller 310C is configured as an infrastructure service manager, an orchestrator for data containers, and a network and identity service provider. Although the BDL controller 310C is considered a component of a multi-component controller in this embodiment, other embodiments can implement a controller using fewer components, such as just the BDL controller 310C. The term "controller" as used herein is therefore intended to be broadly construed.

The PCF 310D is configured to provide platform-as-a-service (PAAS) functionality, including hosting microservices for analytics applications. Access to such microservices, for example, by application developers wishing to use microservices in analytics applications, can be facilitated by automated creation of service brokers within one or more controller components of the analytics platform 305.

In this embodiment, the BDL controller 310C and PCF 310D may be viewed as distinct controllers that are each invoked by the DAC 310A in a hierarchical arrangement of the type mentioned previously herein.

The governor 310E provides data administration and security functionality, including policy authoring, enforcement and audit services for assets.

The global UI 310F assists users in creating and managing workspaces and assets, including data tools, applications and data sources. This illustratively includes publishing from or subscribing to such assets, as well as other functionality such as listing and searching workspaces and assets. The analytics platform 305 may include additional user interfaces, such as administrative interfaces and other types of interfaces designed to support particular types of system users.

The analytics platform 305 further comprises a PDC/ODC database 314 comprising at least one of published data containers (PDCs) and ODCs. For example, such a database can be implemented using HDFS and can comprise multiple data containers used to store and distribute published data.

The data scientist utilizes the workspace 306 to perform data analytics, which may involve building data analytics applications. The data scientist utilizes the global UI 310F to explore data, extract insights, and develop analytic models, as well as to create and manage workspaces and assets.

The system 300 can be utilized for automated deployment of a wide variety of different types of workspaces for its users.

For example, a given workspace automatically deployed in the analytics platform utilizing the controller 310 comprises a data scientist workbench implemented as a Hadoop system comprising multi-node virtual machines with Kerberos security included, a workbench virtual machine for the tools such as MapR and Python for analytics, and an instance of Zaloni for data ingestion.

As another example, a given workspace automatically deployed in the analytics platform utilizing the controller 310 comprises an application developer workbench implemented as a PCF space for hosting applications, data services coming from a dedicated MongoDB and another data service coming from a MySQL database.

As a further example, a given workspace automatically deployed in the analytics platform utilizing the controller 310 comprises a business analyst workbench implemented as a PCF space exposing data services from multiple ODCs, a MySQL database to store data locally and a workbench virtual machine with Tableau installed for analytics reports.

As yet another example, a given workspace automatically deployed in the analytics platform utilizing the controller 310 comprises a data scientist workbench implemented as a workspace equipped with tools for data ingestion and cataloging. Data can be ingested from a variety of legacy data warehouses into a scalable HDFS data lake and cataloged for easy reference, so that data scientist can analyze and share data from various data sources in one workspace using tools installed in the workspace or services accessible through the workspace.

These particular examples as well as the overall configuration of system 300 and its analytics platform 305 are presented for purposes of illustration only, and should not be construed as limiting in any way.

Figure 4:
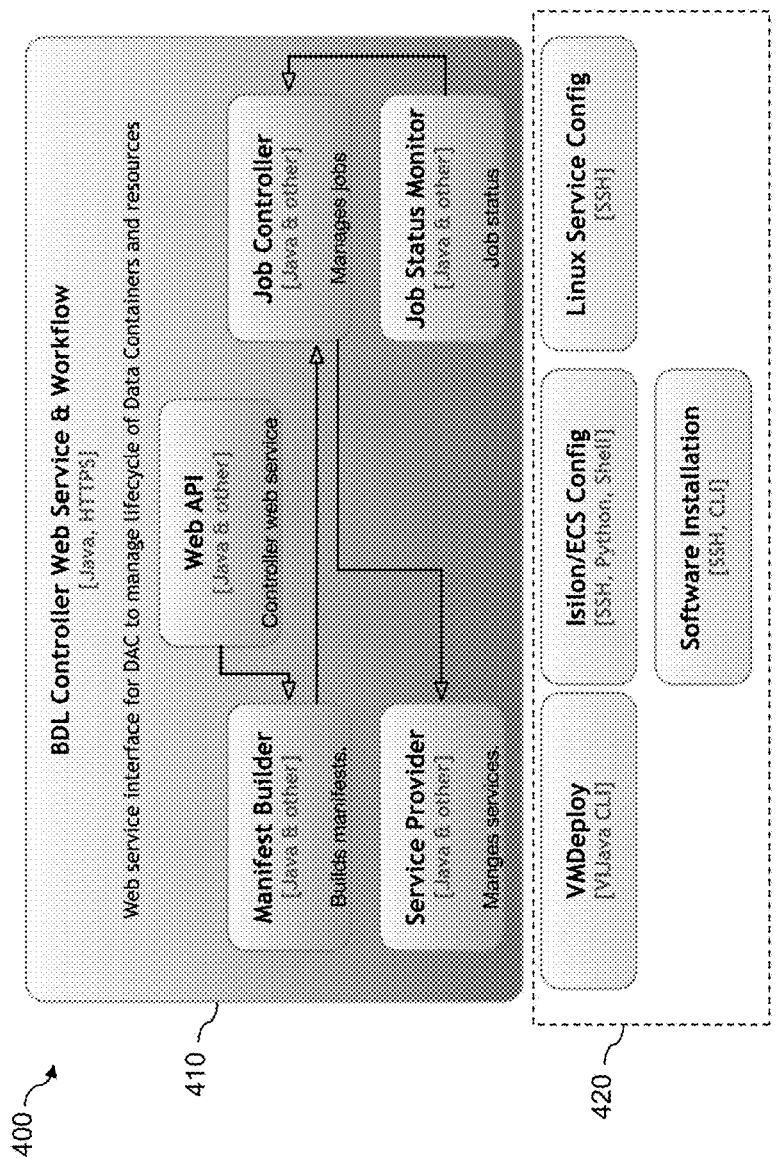
FIG. 4 shows one possible implementation of at least a portion of a controller associated with an analytics platform in an illustrative embodiment.

FIG. 4 shows another illustrative embodiment of an information processing system comprising an automated deployment controller. In this embodiment, information processing system 400 comprises a controller 410. The controller 410 in this embodiment more particularly comprises a BDL controller that includes a web API, a manifest builder, a job controller, a service provider and a job status monitor. Although only single instances of these components are shown in the figure, other embodiments can include multiple instances of each of one or more of the components, as well as additional or alternative components. For example, the controller 410 may also include other components related to the BDL controller, such as those described in conjunction with the FIG. 3 embodiment.

The manifest builder of the BDL controller in this embodiment illustratively generates manifests as specifications of deployment payloads and instructions for deployment. Such manifests are used to guide deployment in a workspace. Additional or alternative manifests may be used in other embodiments.

The BDL controller illustratively provides a web service interface for a DAC of the type previously described to manage the lifecycle of data containers and resources in the system 400. The BDL controller operates in conjunction with additional functional elements 420 of the corresponding analytics platform, including VMDeploy, Isilon™/ECSconfiguration, Linux service configuration, and software installation elements as illustrated. As in the other embodiments, this particular system and controller arrangement is only an illustrative example, and not intended to be limiting in any way.

Figure 5:
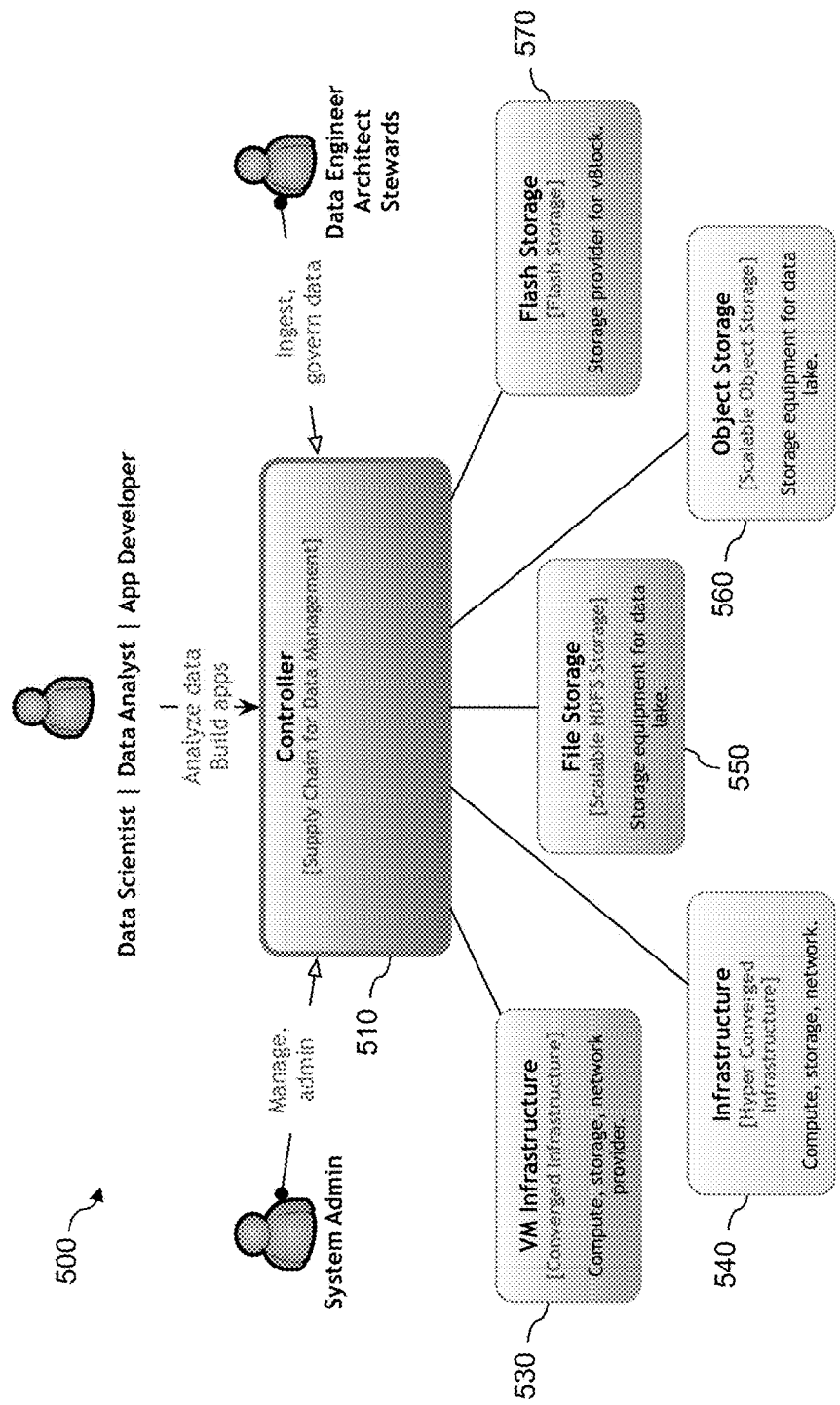
FIG. 5 shows a further illustrative embodiment of an information processing system comprising an analytics platform configured for automated deployment of analytics workspaces.

FIG. 5 shows a further illustrative embodiment of an information processing system 500 comprising an analytics platform configured for automated deployment of analytics workspaces. The system 500 comprises an analytics platform that includes a controller 510 and additional components 530 through 570. As in the FIG. 3 embodiment, the controller 510 in this embodiment implements a supply chain for data management. The controller 510 deploys workspaces for use by users that include data scientists, data analysts and application developers. Such workspaces support data analysis and analytics application and model building. The corresponding analytics platform is supported by a system administrator who manages and administers the system. Additional users such as a data engineer, an architect and one or more stewards are illustratively involved in ingesting and governing of data.

The analytics platform in this embodiment includes virtual machine (VM) infrastructure 530, which is illustratively implemented at least in part utilizing converged infrastructure. The infrastructure 530 more particularly provides virtual resources including compute, storage and network resources.

The analytics platform further comprises additional infrastructure 540 in the form of hyperconverged infrastructure, providing additional virtual resources including compute, storage and network resources.

Also included in the analytics platform is file storage 550, illustratively implemented as scalable HDFS storage. Such storage includes various types of storage equipment utilized to implement portions of a data lake of the analytics platform.

Additional storage provided in the analytics platform in this embodiment includes object storage 560 and flash storage 570. The object storage 560 is implemented as scalable object storage and implements additional portions of the above-noted data lake. The flash storage 570 illustratively provides storage for a Vblock® portion of the converged infrastructure of VM infrastructure 530.

Again, the particular arrangements of illustrative embodiments such as information processing system 500 of FIG. 5 are presented by way of example only, and can be varied in other embodiments.

The various controllers 310, 410 and 510 can be configured to implement at least portions of the automated deployment functionality described in conjunction with the illustrative embodiments of FIGS. 1 and 2.

Illustrative embodiments are configured to provide a number of significant advantages relative to conventional arrangements.

For example, one or more of these embodiments provide automated deployment of analytics workspaces in an analytics platform. A given analytics workspace deployed in this manner can include selected instances of data ingestion engines, data containers, analytics tools, virtual resources and possibly other components, automatically configured for the particular needs of the given analytics workspace without requiring high levels of installation and administration knowledge on the part of the user. In some cases, no installation and administration knowledge is required on the part of the user.

An automated deployment controller in such an embodiment can be configured to provide standardized automated deployment and management of the analytical tools and technologies needed for effectively using an analytics platform in a self-serve manner.

An automated deployment controller in some embodiments illustratively provides a full spectrum of installation and administration services including the provisioning of virtual resources such as compute, storage and networking resources. It enables the delivery of different types of configured, ready-to-use combinations of particular instances of data ingestion engines, data containers and analytics tools to meet the workspace needs of a data scientist, data analyst, application developer or other user.

Illustrative embodiments are additionally or alternatively configured to recommend appropriate tools and technologies based on similarities of user profiles and requirements, drawing from historical workspace creations and user reactions to their completeness and relevance. Such embodiments may also draw inferences from usage patterns of existing workspaces in order to configure a given workspace.

These and other embodiments can facilitate the provision of RBAC, ABAC or other types of security functionality configured in installed tools and technologies in a standard way enabling the data scientist to use them in the workspace. Other types of functionality such as quota management can be provided in a similarly advantageous manner.

Some embodiments provide automated provisioning of an analytics workspace generation framework that permits sharing of data in a data lake across multiple workspaces in an efficient and secure manner to facilitate collaboration between data scientists and other users. This is achieved without the data scientists or other users being required to have in-depth knowledge of the particular storage system configuration or specific data services that are being utilized to implement data containers for the shared data. Similarly advantageous features are provided with regard to data ingestion engines, analytics tools and other components utilized in deployed analytics workspaces of an analytics platform.

Other advantages of one or more embodiments include ease of use through centralized monitoring and enforcement in conjunction with automated and controlled deployment and maintenance of multiple analytics workspaces for respective users. Such an arrangement minimizes user involvement in the workspace deployment and maintenance processes, thereby improving agility, decreasing data latency, and significantly reducing costs.

It is to be appreciated that the foregoing advantages are illustrative of advantages provided in certain embodiments, and need not be present in other embodiments.

As mentioned previously, at least portions of the information processing system 100 may be implemented using one or more processing platforms. Illustrative embodiments of such platforms will now be described in greater detail. Although described in the context of system 100, these platforms may also be used to implement at least portions of other information processing systems in other embodiments of the invention, such as the information processing systems 300, 400 and 500 of respective FIGS. 3, 4 and 5.

Figure 6:
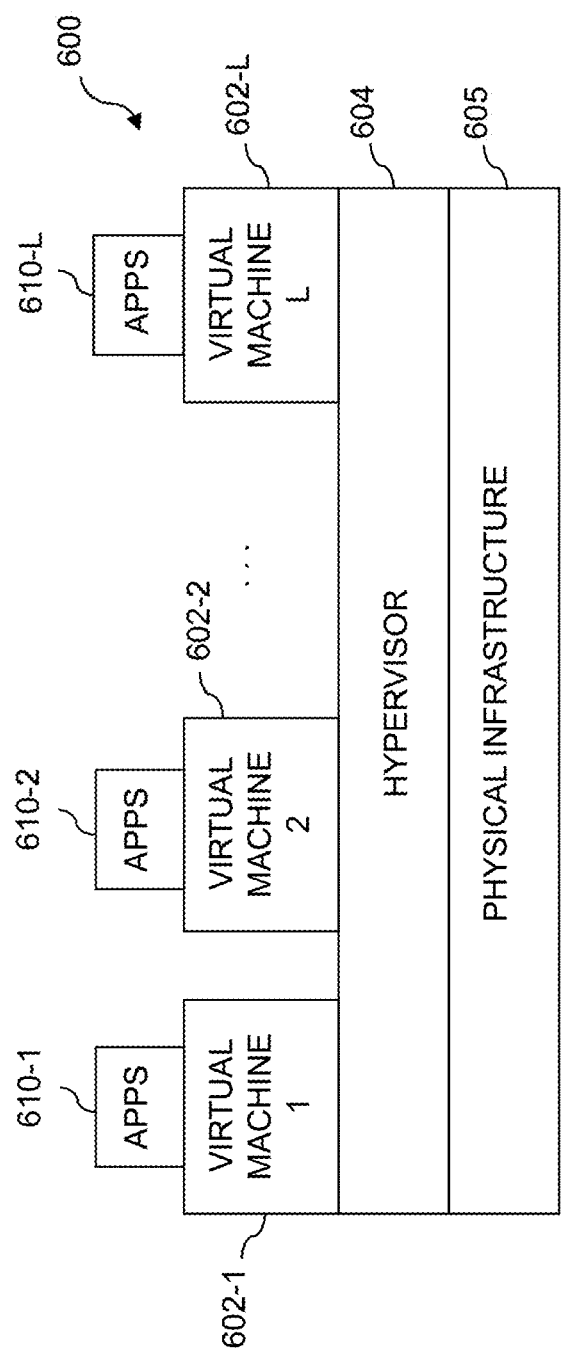
FIGS. 6 and 7 show examples of processing platforms that may be utilized to implement at least a portion of an information processing system in illustrative embodiments.
Figure 7:
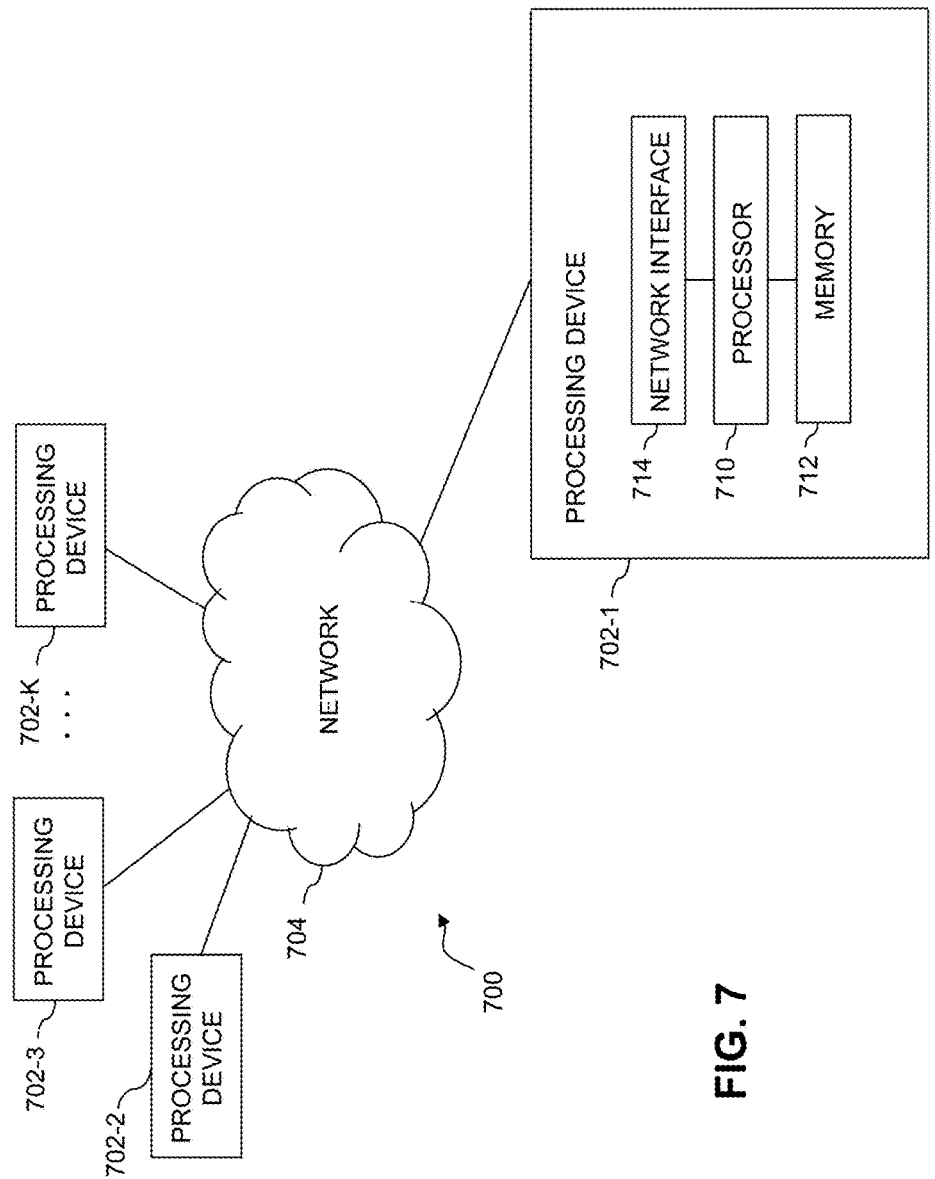

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises virtual machines (VMs) 602-1, 602-2, ... 602-L implemented using a hypervisor 604. The hypervisor 604 runs on physical infrastructure 605. The cloud infrastructure 600 further comprises sets of applications 610-1, 610-2, ... 610-L running on respective ones of the virtual machines 602-1, 602-2, ... 602-L under the control of the hypervisor 604.

Although only a single hypervisor 604 is shown in the embodiment of FIG. 6, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 604 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, ... 702-K, which communicate with one another over a network 704.

The network 704 may comprise any type of network, including by way of example a global computer network such as the Internet, a wide area network (WAN), a local area network (LAN), a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application- specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor- readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platforms Division of EMC Corporation.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

It should again be emphasized that the above-described embodiments of the invention are presented for purposes of illustration only. Many variations and other alternative embodiments may be used. For example, the disclosed techniques are applicable to a wide variety of other types of information processing systems in which it is desirable to provide automated deployment of analytics workspaces. Also, the particular configurations of system and device elements shown in the figures can be varied in other embodiments. Thus, for example, the particular type of analytics platforms, automated deployment controllers, analytics workspaces, ingestion engines, data containers, analytics tools, virtual resources and other components deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   an analytics platform; and
   a controller associated with the analytics platform and configured to control automated deployment of analytics workspaces of the analytics platform;
   the analytics platform having access to at least one set of data ingestion engines, at least one set of data containers, at least one set of analytics tools and at least one set of virtual resources;
   wherein the controller is configured to deploy a given one of the analytics workspaces of the analytics platform as an at least partially user-specified combination of particular selected ones of the data ingestion engines, data containers, analytics tools and virtual resources, the combination comprising at least one of the data ingestion engines, at least one of the data containers, at least one of the analytics tools and at least one of the virtual resources; and
   wherein the analytics platform and its associated controller are implemented by one or more processing devices each comprising a processor coupled to a memory.

2. The apparatus of claim 1 wherein the controller comprises one of a plurality of controllers associated with the analytics platform with the controllers being configured in accordance with a hierarchical architecture in which at least one controller at an upper level of the hierarchical architecture requests services from one or more other controllers at one or more lower levels of the hierarchical architecture.

3. The apparatus of claim 1 wherein the controller is implemented at least in part within the analytics platform.

4. The apparatus of claim 1 wherein the controller is configured to adjust the given analytics workspace by altering the combination of particular selected ones of the data ingestion engines, data containers, analytics tools and virtual resources.

5. The apparatus of claim 1 wherein the controller is configured to monitor usage of the combination of particular selected ones of the data ingestion engines, data containers, analytics tools and virtual resources of the given analytics workspace and to alter the combination responsive to the monitoring.

6. The apparatus of claim 5 wherein the controller is configured to alter the combination so as to maintain enforcement of at least one of a policy-based quota and a service level agreement for at least one component, resource, process or service associated with the given analytics workspace.

7. The apparatus of claim 1 wherein the controller is configured to provision one or more published data sets to the given analytics workspace.

8. The apparatus of claim 1 wherein the controller is configured to provision security functionality to the given analytics workspace so as to control user access to at least one component, resource, process or service associated with that analytics workspace.

9. The apparatus of claim 1 wherein the controller is configured to provision one or more microservices to the given analytics workspace.

10. The apparatus of claim 1 wherein the controller is configured to recommend to a corresponding user additional ones of the data ingestion engines, data containers, analytics tools and virtual resources for inclusion in the given analytics workspace.

11. The apparatus of claim 10 wherein the recommendation by the controller is based at least in part on one or more of user profile similarities, user requirement similarities and historical usage patterns relating to the given analytics workspace and one or more other ones of the analytics workspaces.

12. The apparatus of claim 1 wherein the controller is configured to break down the given analytics workspace such that the corresponding virtual resources are made available for potential use in one or more other ones of the analytics workspaces.

13. The apparatus of claim 1 wherein the virtual resources comprise particular arrangements of compute, storage and network resources.

14. The apparatus of claim 1 wherein the analytics platform additionally has access to multiple data transport protocols of different types and wherein the controller is configured to deploy the given analytics workspace so as to include functionality for selected ones of the data transport protocols.

15. A method comprising:
   providing an analytics platform with access to at least one set of data ingestion engines, at least one set of data containers, at least one set of analytics tools and at least one set of virtual resources; and
   controlling automated deployment of analytics workspaces of the analytics platform;
   wherein controlling automated deployment of the analytics workspaces comprises configuring a given one of the analytics workspaces as an at least partially user-specified combination of particular selected ones of the data ingestion engines, data containers, analytics tools and virtual resources, the combination comprising at least one of the data ingestion engines, at least one of the data containers, at least one of the analytics tools and at least one of the virtual resources; and
   wherein the providing and controlling are performed by at least one processing device comprising a processor coupled to a memory.

16. The method of claim 15 wherein controlling automated deployment of the analytics workspaces further comprises:

monitoring usage of the combination of particular selected ones of the data ingestion engines, data containers, analytics tools and virtual resources of the given analytics workspace; and altering the combination responsive to the monitoring.

17. The method of claim 15 wherein controlling automated deployment of the analytics workspaces further comprises recommending to a corresponding user additional ones of the data ingestion engines, data containers, analytics tools and virtual resources for inclusion in the given analytics workspace, based at least in part on one or more of user profile similarities, user requirement similarities and historical usage patterns relating to the given analytics workspace and one or more other ones of the analytics workspaces.

18. A computer program product comprising a non-transitory processor-readable storage medium having one or more software programs embodied therein, wherein the one or more software programs when executed by at least one processing device causes said at least one processing device:

to provide an analytics platform with access to at least one set of data ingestion engines, at least one set of data containers, at least one set of analytics tools and at least one set of virtual resources; and to control automated deployment of analytics workspaces of the analytics platform;

wherein controlling automated deployment of the analytics workspaces comprises configuring a given one of the analytics workspaces as an at least partially user-specified combination of particular selected ones of the data ingestion engines, data containers, analytics tools and virtual resources, the combination comprising at least one of the data ingestion engines, at least one of the data containers, at least one of the analytics tools and at least one of the virtual resources.

19. The computer program product of claim 18 wherein controlling automated deployment of the analytics workspaces further comprises:

monitoring usage of the combination of particular selected ones of the data ingestion engines, data containers, analytics tools and virtual resources of the given analytics workspace; and altering the combination responsive to the monitoring.

20. The computer program product of claim 18 wherein controlling automated deployment of the analytics workspaces further comprises further comprises recommending to a corresponding user additional ones of the data ingestion engines, data containers, analytics tools and virtual resources for inclusion in the given analytics workspace, based at least in part on one or more of user profile similarities, user requirement similarities and historical usage patterns relating to the given analytics workspace and one or more other ones of the analytics workspaces.

\* \* \* \* \*